United States Patent
König et al.

(10) Patent No.: US 6,187,860 B1
(45) Date of Patent: Feb. 13, 2001

(54) AQUEOUS POLYISOCYANATE CROSSLINKING AGENTS MODIFIED WITH HYDROXYCARBOXYLIC ACIDS AND PYRAZOLE-BASED BLOCKING AGENTS

(75) Inventors: Eberhard König; Heino Müller; Harald Blum, all of Leverkusen; Joachim Petzoldt, Monheim, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/262,858

(22) Filed: Mar. 5, 1999

(30) Foreign Application Priority Data

Mar. 12, 1998 (DE) .............................................. 198 10 660

(51) Int. Cl.[7] .............................. C08J 3/00; C08K 3/20; C08L 75/00; C08G 18/81
(52) U.S. Cl. ......................... 524/591; 524/589; 524/590; 524/839; 524/840; 528/45
(58) Field of Search .................................. 524/591, 839, 524/840, 589, 590; 528/45

(56) References Cited

U.S. PATENT DOCUMENTS

| 4,976,837 | 12/1990 | Hughes et al. | 204/181.7 |
|---|---|---|---|
| 5,294,665 | 3/1994 | Pedain et al. | 524/591 |
| 5,399,294 | 3/1995 | Quednau | 252/357 |
| 5,455,297 | 10/1995 | Pedain et al. | 524/591 |
| 5,723,536 | 3/1998 | Baumbach et al. | 524/591 |
| 5,739,216 | * 4/1998 | Duecoffre et al. | 528/438 |
| 5,981,653 | * 11/1999 | Wilmes et al. | 524/839 |

FOREIGN PATENT DOCUMENTS

97/12924  4/1997  (WO).

* cited by examiner

*Primary Examiner*—Patrick D. Niland
(74) *Attorney, Agent, or Firm*—Joseph C. Gil; Thomas W. Roy

(57) ABSTRACT

The present invention relates to aqueous or water dilutable blocked polyisocyanates containing a) a polyisocyanate component and, based on the equivalents of isocyanate groups, b) 60 to 85 equivalent % of a pyrazole blocking agent, c) 15 to 40 equivalent % of a monohydroxycarboxylic acid to impart hydrophilic properties and d) 0 to 15 equivalent % of a difunctional chain extender containing OH and/or $NH_2$ groups, wherein the amounts of a) to d) are selected so that the equivalent ratio of NCO groups of component a) to isocyanate-reactive groups of components b), c) and d) is 1:0.8 to 1:1.2.

The present invention also relates to a process for preparing these polyisocyanate crosslinking agents and to their use in combination with polyhydroxyl compounds which are soluble and/or dispersible in water as binders for aqueous stoving lacquers.

14 Claims, No Drawings

AQUEOUS POLYISOCYANATE CROSSLINKING AGENTS MODIFIED WITH HYDROXYCARBOXYLIC ACIDS AND PYRAZOLE-BASED BLOCKING AGENTS

BACKGROUND OF THE INVENTION

1. Field of the Invention

The present invention relates to aqueous polyisocyanate crosslinking agents which are modified with monohydroxy carboxylic acids and blocked with pyrazole-based compounds, and to their use as a clear coating composition or a primer surfacer for coating automobiles.

2. Description of the Prior Art

Pyrazoles, e.g., 3,5-dimethylpyrazole, are one of the few isocyanate blocking agents which are stable in aqueous media and capable of forming reactive crosslinking agents. For example, an aliphatic polyisocyanate which is blocked with 3,5-dimethylpyrazole crosslinks under mild stoving conditions of 30 minutes at 120 to 130° C.; whereas, a polyisocyanate which is blocked with butanone oxime requires 30 minutes at 140° C.

Aqueous polyisocyanate crosslinking agents, which are blocked with pyrazoles, are described, e.g., in WO 97/12924, wherein the compounds that impart hydrophilic properties to the crosslinking agent are restricted to polyhydroxy carboxylic acids. The use of monohydroxy carboxylic acids to impart hydrophilicity is not disclosed.

It is known from EP-A 576,952 and EP-A 566,953 that polyisocyanates which are modified with hydroxypivalic acid and polyisocyanates which are blocked with ε-caprolactam, diethyl malonate, acetoacetic ester or oximes can be used for the production of water-dispersible polyisocyanate mixtures.

EP-A 802,210 also describes aqueous polyisocyanate crosslinking agents which are blocked with 3,5-dimethylpyrazole. Hydrophilic properties are imparted to these crosslinking agents with non-ionic polyethylene oxide chains. However, it has been shown that coating compositions containing these crosslinking agents possess permanent hydrophilic properties and, therefore, cannot withstand a salt-spray test. The corrosion resistance of these coatings is unsatisfactory for the automobile industry.

An object of the present invention is to eliminate the aforementioned disadvantages and to provide an aqueous polyisocyanate crosslinking agent which exhibits good reactivity, which can be synthesized in a simple manner and which exhibits good corrosion-resistance.

This object may be achieved with the polyisocyanate crosslinking agents according to the invention, which are described hereinafter.

SUMMARY OF THE INVENTION

The present invention relates to aqueous or water dilutable blocked polyisocyanates containing a) a polyisocyanate component and, based on the equivalents of isocyanate groups, b) 60 to 85 equivalent % of a pyrazole blocking agent, c) 15 to 40 equivalent % of a monohydroxycarboxylic acid to impart hydrophilic properties and d) 0 to 15 equivalent % of a difunctional chain extender containing OH and/or $NH_2$ groups, wherein the amounts of a) to d) are selected so that the equivalent ratio of NCO groups of component a) to isocyanate-reactive groups of components b), c) and d) is 1:0.8 to 1:1.2.

The present invention also relates to a process for preparing these polyisocyanate crosslinking agents by i) introducing polyisocyanate component a) and optionally 5 to 10% by weight, based on solids, of a water-miscible solvent into a reaction vessel, ii) reacting about 50% by weight of the NCO groups with a pyrazole blocking agent in a first reaction step at about 80° C., reacting a portion of the NCO groups with a monohydroxy carboxylic acid in a subsequent reaction step, iii) reacting the remainder of the NCO groups with additional pyrazole blocking agent and iv) subsequently neutralizing a sufficient amount of the carboxyl groups to carboxylate groups to form a stable aqueous dispersion, wherein components b) and c) contain sufficient isocyanate-reactive groups to react with 80 to 120 equivalent % of the NCO groups of component a).

Finally, the present invention also relates to the use of the aqueous or water dilutable blocked polyisocyanates in combination with polyhydroxyl compounds which are soluble and/or dispersible in water as binders for aqueous stoving lacquers.

DETAILED DESCRIPTION OF THE INVENTION

Polyisocyanates a) which are used as starting materials to form the blocked polyisocyanates according to the invention are known lacquer polyisocyanates containing aliphatically and/or cycloaliphatically bound isocyanate groups, and have an isocyanate content of 7 to 30%, preferably 12 to 25% by weight. Preferred lacquer polyisocyanates are those containing biuret, isocyanurate and/or uretdione groups, and prepared from 1,6-diisocyanatohexane (HDI), 1-isocyanato-3,3,5-trimethyl-5-iso-cyanatomethyl-cyclohexane (IPDI) and/or bis-(4-isocyanatocyclo-hexyl)-methane (HMDI).

In addition, polyisocyanates or short-chain NCO prepolymers based on aromatic diisocyanates, such as diisocyanatotoluene (TDI) or 4,4'-diisocyanatodiphenylmethane (MDI), can also be used.

Lacquer polyisocyanates containing isocyanurate groups and prepared from HDI or HMDI are particularly preferred as component a).

Suitable blocking components include 1H-pyrazoles, such as pyrazole, 3-methyl-pyrazole or 3,5-dimethylpyrazole. 3,5-dimethylpyrazole is preferred and may be obtained by the condensation of hydrazine hydrate with acetylacetone.

Monohydroxycarboxylic acids containing one or two α-methyl groups are preferred as hydrophilic component c). Hydroxypivalic acid or hydroxymethyidimethylacetic acid (2-hydroxymethyl-2-methylpropionic acid) are particularly preferred, optionally in the presence of small amounts, e.g., 0.001 to 0.1% by weight, of other compounds which impart hydrophilic properties, such as OH-functional hydrophilic polyethers or polyhydroxycarboxylic acids.

Diamines, diols and hydroxyamines having a molecular weight of 32 to 300 are suitable as the difunctional chain extender c). Examples include hydrazine, ethylene diamine, isophorone diamine, the bisketimine of isophorone diamine and methyl isobutyl ketone, 1,4-dihydroxybutane, ethanolamine, N-methylethanolamine, hydroxyethyl ethylene diamine, or the addition product of 2 moles of propylene carbonate and 1 mole of hydrazine which corresponds to the formula

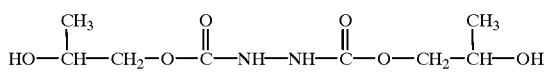

Examples of suitable neutralizing agents include dimethylethanolamine, methyldiethanolamine, triethylamine, N-methylmorpholine and 2-amino-2-methylpropanol.

During the preparation of the blocked polyisocyanates 80 to 100 equivalent %, preferably 100 equivalent %, of the isocyanate-reactive groups of components b), c) and d) are present for each isocyanate group of component a).

In order to produce an aqueous solution or dispersion, a warm solution of component a), which has been blocked and rendered hydrophilic, is mixed with warm distilled water and stirred. To produce an organically dissolved, water dilutable crosslinking agent, which is stable in storage at room temperature, the aforementioned batch has to be blended with additional solvent in order to reduce its viscosity.

The polyisocyanate crosslinking agents according to the invention have the following advantages:

- they can also be produced, relatively free from problems, using high functionality (functionality of 3 to 4) polyisocyanate components a).
- the stoving conditions are just 30 minutes at 120 to 130° C.
- thermal yellowing is significantly less than with polyisocyanate crosslinking agents which are blocked with butanone oxime.

The simple synthesis and improved anti-corrosion properties (salt-spray test) are demonstrated in the following examples.

EXAMPLES

Example 1

In this example according to the invention, 75 equivalent % of the NCO groups of a lacquer polyisocyanate were blocked with dimethylpyrazole and 25 equivalent % were rendered hydrophilic with hydroxypivalic acid.

| Batch | |
|---|---|
| 200.0 g (1.0 equiv.) | of an isocyanurate group-containing lacquer polyisocyanate prepared from 1,6-diisocyanatohexane (HDI) and having an NCO content of about 21%, a viscosity at 23° C. of about 3000 mPa.s and a functionality of about 3.5 |
| 72.0 g (0.75 equiv.) | 3,5-dimethylpyrazole |
| 29.5 g (0.25 equiv.) | hydroxypivalic acid |
| 22.2 g (0.25 moles) | dimethylethanolamine |
| 30.0 g | N-methylpyrrolidone |
| 422.3 g | water |
| 776.0 g (0.75 equiv.) | blocked NCO groups |
| solids content: | (301.5 g) 38.9% |
| viscosity: | about 2000 mPa.s |
| blocked NCO content: | 4.0% |
| blocked NCO eq. wt. | 1050 g |

Experimental:

The polyisocyanate, N-methylpyrrolidine and a portion (48 g, 0.5 moles) of the dimethylpyrazole were reacted for about 5 hours at 85° C. until an NCO content of 7.5 to 7.7% was measured. Thereafter, crystalline hydroxypivalic acid was added and the batch was stirred for about 2 hours and 30 minutes at about 65° C., until an NCO content of 3.4% was measured.

The remaining amount of solid dimethylpyrazole (24 g, 0.25 moles) was then added and the batch was subsequently stirred for about 30 minutes at 65° C., until free NCO groups were no longer detected by IR spectroscopy. The batch was then neutralized, with stirring, by adding imethylethanolamine. Deionized water at 70° C. was added dropwise and a shimmering blue dispersion (which was almost a solution) of a blocked polyisocyanate crosslinking agent was obtained. The blocked NCO content was 4.0% and the blocked NCO equivalent weight was 1050 g.

Example 2 (comparative example)

This example shows that it is difficult to produce a polyisocyanate crosslinking agent which is dispersed in water and which is stable in storage using a dihydroxycarboxylic acid such as dimethylolpropionic acid and the highly functional polyisocyanate (f=at least 3.5) according to example 1.

Example 1 was repeated with the exception that hydroxypivalic acid was replaced with 0.25 equiv. (6.75 g) of dimethylolpropionic acid. After the final NCO measurement, a highly viscous, thread-like melt was obtained, which almost resembled a jellyfish, and which could not be dispersed.

Example 3 (example of application)

This example demonstrates the properties of the crosslinking agent as in example 1 in clear lacquers, compared with a commercially available polyisocyanate crosslinking agent that is blocked with butanone oxime.

| Clear coating composition | 1 | 2 |
|---|---|---|
| Bayhydrol VP LS 2017, Bayer AG, a 42% very fine hydroxylpolyester dispersion OH equiv. wt. = 1889 g | 65.06 | 57.27 |
| Bayhydur BL 5140 Bayer AG, a 39.5% solution of butanone oxime-blocked polyisocyanate blocked NCO equiv. wt. = 955 g | 32.89 | — |
| crosslinking agent from example 1 | — | 31.35 |
| Additol XW 395, Vianova Resin, flow enhancer | 0.72 | 0.69 |
| Surfinol 104 E, Air Products/Biesterfeld, anti-crater agent | 0.72 | 0.69 |
| dist. water | 0.61 | 10.00 |
| Parts by weight | 100.00 | 100.00 |
| Blocked NCO:OH equivalent ratio = 1:1 The binder resins and additives were homogenously mixed by means of a stirrer and were processed after 2 hours. | | |
| solids content | about 40% | about 38% |
| ISO Cup run-out time 5 mm/23° C. | about 40 sec | about 38 sec |
| Run-out time after storing coating composition for 7 days at 40° C. | about 34 sec | about 31 sec |
| A film having a wet film thickness of about 120 μm was applied to glass plates by means of a commercially available coating roller system, and after pre-drying for 10 minutes/23° C., was stoved for 30 minutes at 120° C. in a circulating hot air oven. | | |
| König pendulum hardness | about 7 sec | about 19 sec |
| 1-minute resistance to toluene/ methoxypropyl acetate/ethyl acetate/acetone | 5/5/5/5 | 4/3/5/5 |

-continued

| Clear coating composition | 1 | 2 |
|---|---|---|
| (0 = no effect; 5 = film destroyed) | | |
| Stoving conditions, 30 min at 140° C. | about 32 sec | about 38 sec |
| König pendulum hardness | | |
| 1-minute resistance to toluene/ | 4/3/4/4 | 4/2/4/4 |
| methoxypropyl acetate/ethyl acetate/acetone | | |
| For the salt-spray test the coating compositions were sprayed onto steel panels by means of flow-cup guns and stoved for 30 minutes at 140° C. | | |
| 144 hour salt-spray test DIN 53 167 | MG* 26 mm | MG* 10 mm |

[MG* = migration underneath]

The preceding comparison demonstrates that coating composition 2, which contains the crosslinking agent according to the invention, was more reactive than coating composition 1. This is apparent from the higher film hardness and improved solvent resistance at a low stoving temperature of 120° C. At a stoving temperature of 140° C. the properties were similar. However, coating composition 2 (with a migration underneath of only 10 mm) behaved much better than coating composition 1 in the salt-spray test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous or water dilutable blocked polyisocyanate comprising
    a) a polyisocyanate component and, based on the equivalents of isocyanate groups,
    b) 60 to 85 equivalent % of a pyrazole blocking agent,
    c) 15 to 40 equivalent % of a monohydroxycarboxylic acid to impart hydrophilic properties and
    d) 0 to 15 equivalent % of a difunctional chain extender containing OH and/or $NH_2$ groups,
        wherein the amounts of a) to d) are selected such that the equivalent ratio of NCO groups of component a) to isocyanate-reactive groups of components b), c) and d) is 1:0.8 to 1:1.2.

2. The blocked polyisocyanate of claim 1 wherein said polyisocyanate component comprises a lacquer polyisocyanate containing aliphatically and/or cycloaliphatically bound isocyanate groups and having an isocyanate content of 7 to 30% by weight.

3. The blocked polyisocyanate of claim 2 wherein said lacquer polyisocyanates contains biuret, isocyanurate and/or uretdione groups and is prepared from 1,6-diisocyanatohexane, 1-isocyanato-3,3,5-trimethyl-5-iso-cyanatomethyl-cyclohexane and/or bis-(4-isocyanatocyclohexyl)-methane.

4. The blocked polyisocyanate of claim 1 wherein said pyrazole blocking agent comprises 3,5-dimethylpyrazole.

5. The blocked polyisocyanate of claim 2 wherein said pyrazole blocking agent comprises 3,5-dimethylpyrazole.

6. The blocked polyisocyanate of claim 3 wherein said pyrazole blocking agent comprises 3,5-dimethylpyrazole.

7. The blocked polyisocyanate of claim 1 wherein said monohydroxy carboxylic acid comprises hydroxypivalic acid.

8. The blocked polyisocyanate of claim 2 wherein said monohydroxy carboxylic acid comprises hydroxypivalic acid.

9. The blocked polyisocyanate of claim 3 wherein said monohydroxy carboxylic acid comprises hydroxypivalic acid.

10. The blocked polyisocyanate of claim 4 wherein said monohydroxy carboxylic acid comprises hydroxypivalic acid.

11. The blocked polyisocyanate of claim 5 wherein said monohydroxy carboxylic acid comprises hydroxypivalic acid.

12. The blocked polyisocyanate of claim 6 wherein said monohydroxy carboxylic acid comprises hydroxypivalic acid.

13. A process for preparing the blocked polyisocyanate of claim 1 which comprises
    i) introducing polyisocyanate component a) and optionally 5 to 10% by weight, based on solids, of a water-miscible solvent into a reaction vessel,
    ii) reacting about 50% by weight of the NCO groups with a pyrazole blocking agent in a first reaction step at about 80° C., reacting a portion of the NCO groups with a monohydroxy carboxylic acid in a subsequent reaction step,
    iii) reacting the remainder of the NCO groups with additional pyrazole blocking agent and
    iv) subsequently neutralizing a sufficient amount of the carboxyl groups to carboxylate groups to form a stable aqueous dispersion,
        wherein components b) and c) contain sufficient isocyanate-reactive groups to react with 80 to 120 equivalent % of the NCO groups of component a).

14. An aqueous stoving composition containing as binder the blocked polyisocyanate of claim 1 and a polyhydroxyl compound which is soluble and/or dispersible in water.

* * * * *